Figure 1:
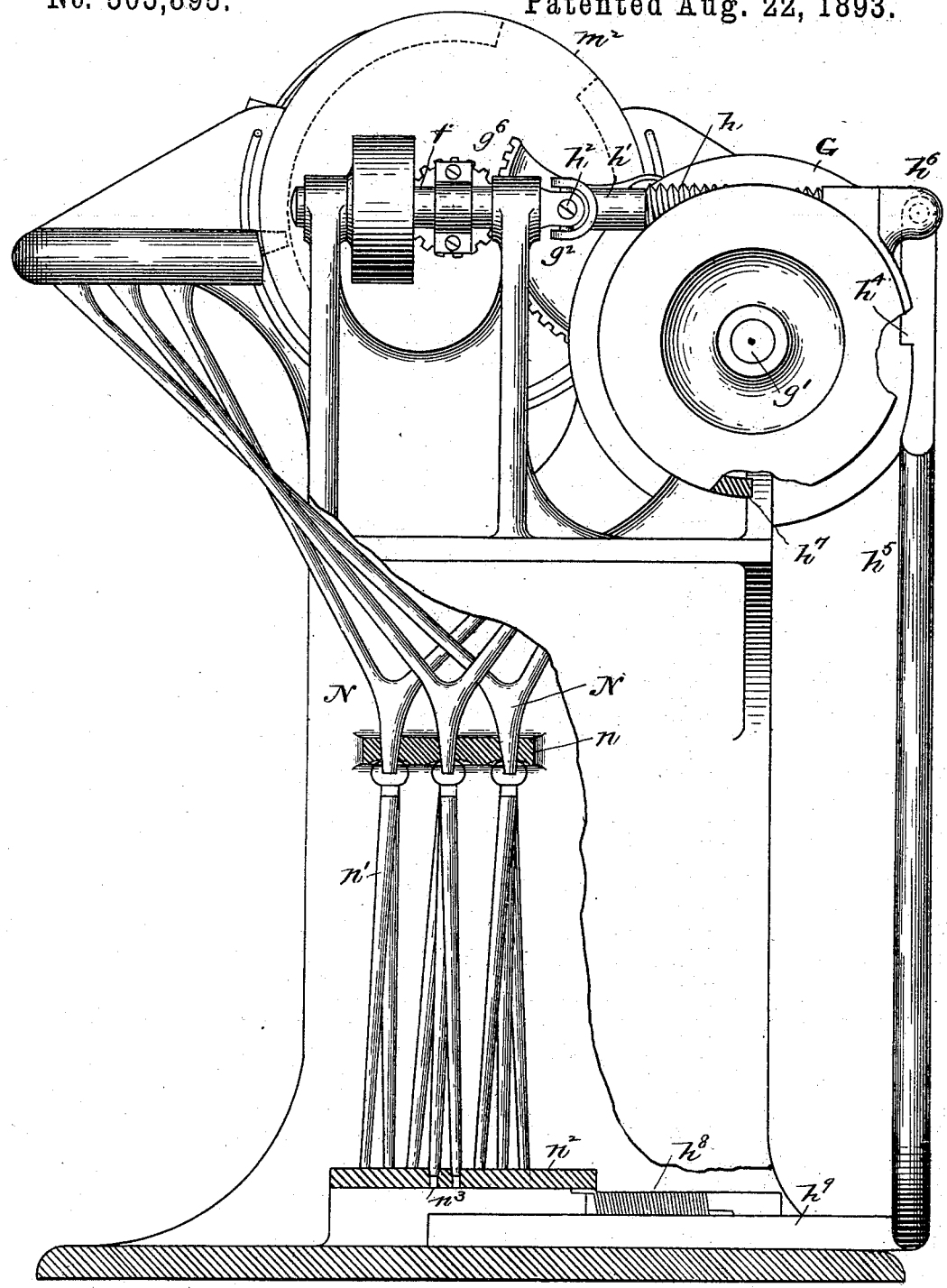

(No Model.) 5 Sheets—Sheet 4.

J. M. BENJAMIN & R. C. SIMMONS.
NAIL SEPARATING AND FEEDING DEVICE.

No. 503,895. Patented Aug. 22, 1893.

WITNESSES
J. M. Dolan
J. W. Cummings

INVENTORS.
John M. Benjamin
Ralph C. Simmons
by their Atty.
Clarke & Raymond

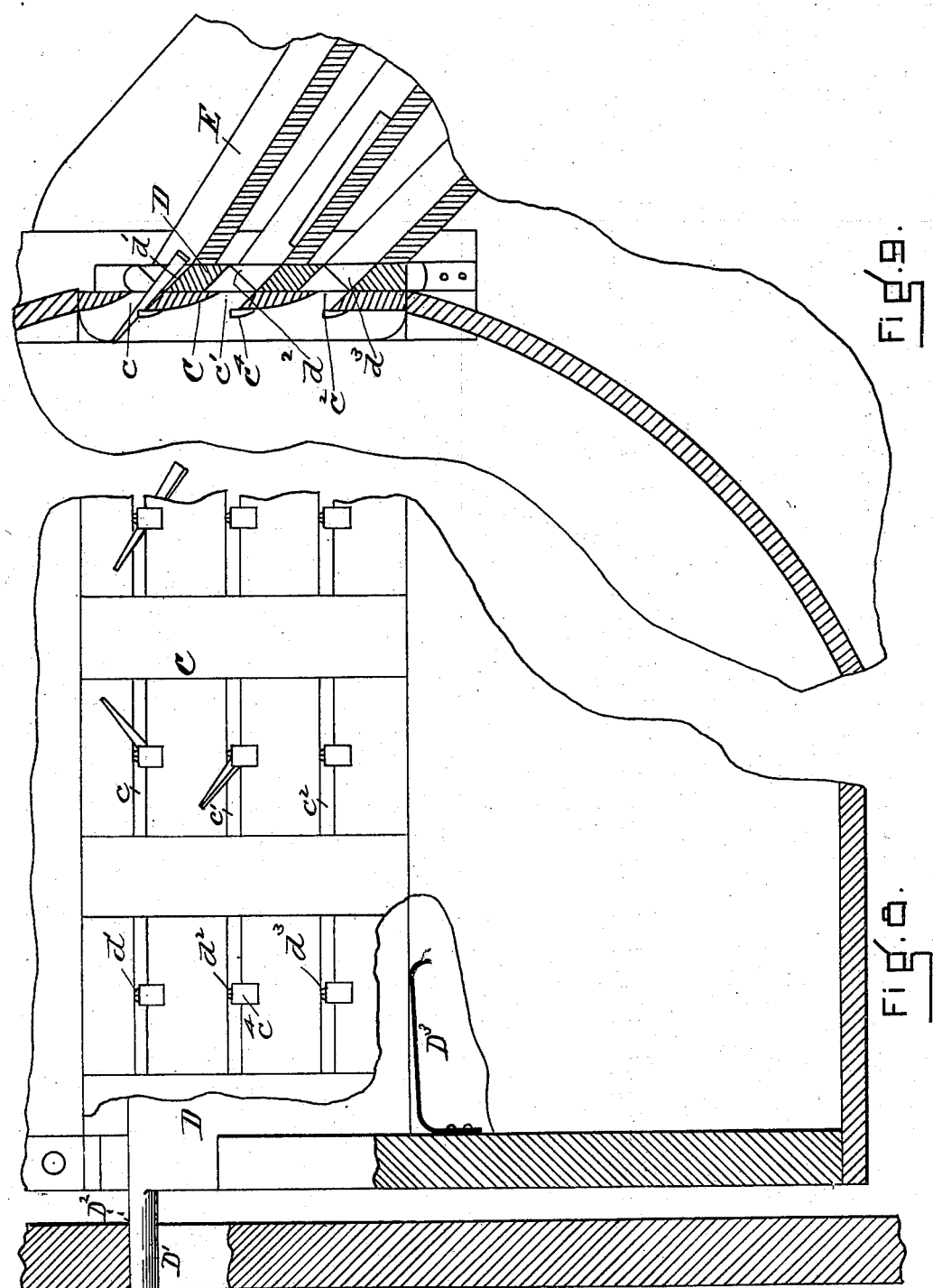

UNITED STATES PATENT OFFICE.

JOHN M. BENJAMIN AND RALPH C. SIMMONS, OF LAWRENCE, ASSIGNORS TO CHARLES F. BROWN, TRUSTEE, OF READING, MASSACHUSETTS.

NAIL SEPARATING AND FEEDING DEVICE.

SPECIFICATION forming part of Letters Patent No. 503,895, dated August 22, 1893.

Application filed July 18, 1892. Serial No. 440,371. (No model.)

*To all whom it may concern:*

Be it known that we, JOHN M. BENJAMIN and RALPH C. SIMMONS, citizens of the United States, residing at Lawrence, in the county of Essex, in the State of Massachusetts, have invented a new and useful Improvement in Nail Separating and Feeding Devices, of which the following is a full, clear, and exact description, reference being had to the accompanying drawings, forming a part of this specification, in explaining its nature.

The invention relates; first, to the nail separator; and, second, to appropriate means used therewith for receiving, transferring and distributing the nails.

The separator comprises a cylindrical shell having a quick, longitudinal, vibrating movement, and a slow rotary or oscillating movement, preferably of about a third of a revolution. When the apparatus is used as a double separator this shell has in its sides two groups of pools or pockets, separated from each other by about one-third of the circumference of the shell, and each pocket or pool is of a shape to receive and hold one nail lying lengthwise in it, and to deliver such nail outwardly when the pool or pocket has been lifted sufficiently to incline its bottom and bring it opposite the mouth of a suitable conveying channel or chute. The nails are deposited in bulk in the chamber formed by the shell, and each group of pools or pockets is successively moved under them by the partial rotation of the cylinder or shell in one direction or the other. The rapid vibratory movement of the cylinder or shell, while the pools or pockets are thus passing under the nails, disposes or separates the nails into lines running lengthwise the cylinder or shell, and they are thus deposited in the pools or pockets as they are moving under the mass of nails and as they are leaving it, and the further upward movement of the pools or pockets, and their continued sharp vibration with the cylinder or shell, causes all the nails but one in each pool or pocket to be dislodged therefrom and to fall back into the chamber. A spur or finger centrally located in front of each pool or pocket and extending slightly above it serves to keep one nail only in the pocket after it has reached a certain height. When the pockets have been lifted the desired extent the shell or cylinder is held stationary for an instant so far as the rotating movement is concerned. The vibrating movement, however, continuing, and the nails then slide or are dislodged from the pools or pockets, falling outward through holes in the shell or cylinder, then for the first time uncovered; then by suitable turning or tilting bars or edges caused to be thrown or turned headforemost down the inclined chutes or channels. While one group of pools or pockets is thus delivering its nails, the other is receiving or taking nails, being at that time below the mass of nails held in the shell or cylinder.

While we prefer to employ pools or pockets arranged in two groups, each of which has two or more lines, yet, we do not wish to be understood as limiting ourselves to this particular arrangement of pools, as one group or one line only or one pool may be used without affecting the essential spirit of the invention.

The devices for transferring the nails from the pools as well as the mechanism for actuating the shell or cylinder and the specific construction of the pools will be hereinafter more fully described.

Figure 2:
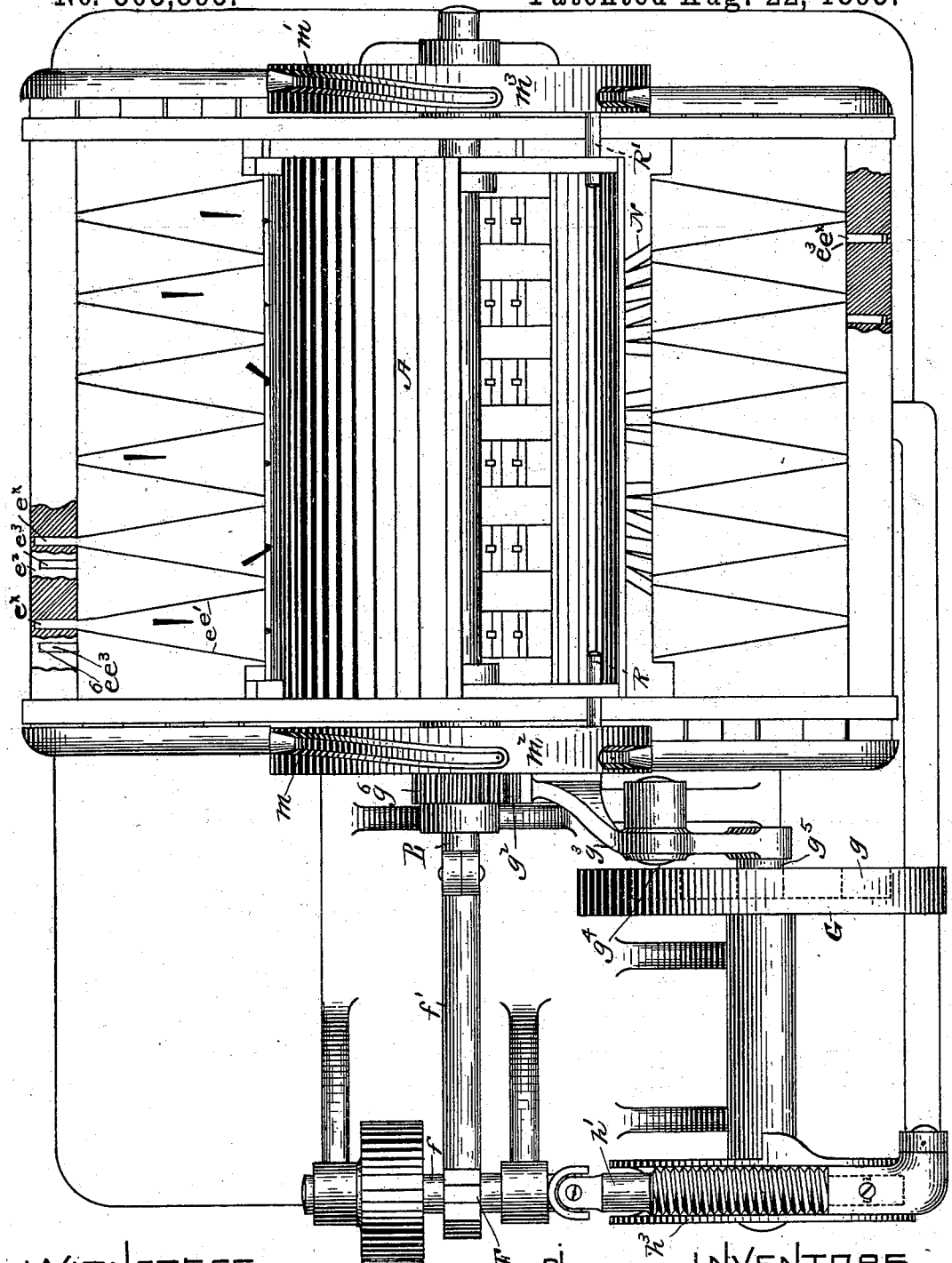
Figure 3:
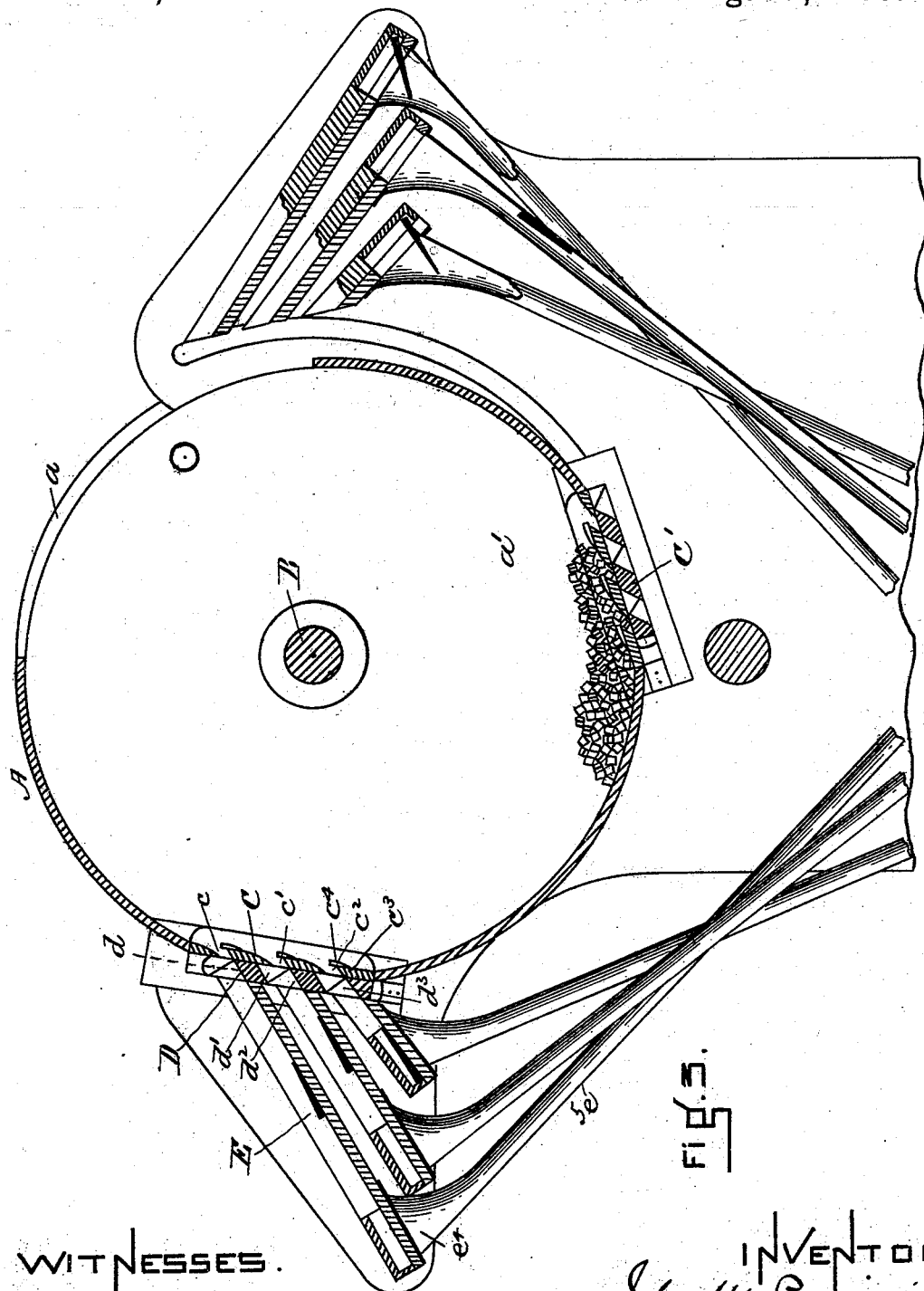

In the drawings: Figure 1 is a view in front elevation of one form of the machine in which our invention may be embodied. Fig. 2 is a view in plan thereof. Fig. 3 is a view in vertical cross section of the principal parts thereof. Figs. 4, 5, 6, 7, 8 and 9 are detail views representing a portion of the nail delivering or distributing mechanism to which reference will be hereinafter made.

A is the nail cylinder or shell. It has the opening $a$ by which the nails in bulk are fed to the nail chamber $a'$. The cylinder, when two groups of pools or pockets in two or more lines are used, is preferably hung somewhat eccentrically, and in Fig. 3 it is so shown, B being the shaft which communicates to it the vibratory movement.

C represents one group of the pools or pockets and C' the other. Each group is represented as having three lines $c$ $c'$ $c^2$ of pools or pockets, each line being made up of as many separate ones as may be desired. These lines of pools or pockets are formed preferably in a pocket plate, which also preferably for ease of manufacture is straight, and it is because these plates are straight that we have hung the cylinder eccentrically, in order that all the various lines of pools may be simultaneously brought opposite the entrances to their respective channels. (See Fig. 3.)

Each pool or pocket is formed by a hole extending through the pool plate, and having a bottom $c^3$ inclined downwardly and outwardly when elevated to its highest position. (See Fig. 3.) The hole is a trifle longer than the nail it receives, and there is arranged in the front of it a slight spur or finger $c^4$ which extends above the level of the bottom $c^3$ sufficient to hold one nail in the pool or pocket after it has reached a certain elevation in its upward movement. Another essential part of the pool is the plate which closes the pocket opening upon the outside at all times except when delivering nails to the nail receiving chutes or channels. This plate is in the nature of a slide. It is lettered D, and it has the sections $d$ which serve to close the pool openings and the holes $d'$ which are larger than the pool or pocket openings, and which are brought in line with them when the pools or pockets have reached their highest position. (See Fig. 3.) They have the inclined bottoms $d^2$ and when fully opened form a section of the guide-way by which the nails are guided from the pools or pockets to the incline nail receiving chutes E. The slide plate oscillates with the shell, but is held stationary an instant before the shell or cylinder reaches the upward end of its oscillating movement to open the pools. The slide plate is held to open the pool openings by pins $D'$ coming in contact with stops $D^2$, one only being shown in Fig. 8, and is moved to close them by means of the spring $D^3$. The slide plate also has the nail turning edges or bars $d^3$ which are in the shape of a thin partition extending vertically across each opening, and so placed as to cause the head of the nail to over-balance the point, and thus when falling against it to descend into its channel first. (See Fig. 3.)

The cylinder or shell A is vibrated by means of the crank F, on the pulley shaft $F'$, and the pitman $f'$, which is connected with the end of the cylinder shaft B. The cylinder is partially rotated or oscillated forward and back while it is being vibrated, and held for an instant at the end of its upward movement in either direction, or while the nails are being discharged into channels E by means of the cam groove $g$ in the cam disk G on the shaft $g'$ and the sector gear $g^2$ at the end of the sector lever $g^3$ pivoted at $g^4$, and having the cam pin $g^5$, which enters the cam groove $g$, and the pinion $g^6$, in which the shaft B plays.

The machine as represented in the drawings is designed to constantly vibrate the shell or cylinder A, so long as the pulley shaft $f$ may rotate, but to only oscillate or partially rotate the cylinder when it is desired to obtain a load or group of nails; and to accomplish this there is a device in the nature of a clutch between the driven shaft $f$ and the cam shaft $g'$ and this clutch comprises the worm $h$ upon a worm shaft $h'$ connected with the shaft F by a universal joint $h^2$, and a worm wheel $h^3$ on the shaft $g'$. This worm $h$ is normally held from engagement with the worm wheel by means of the latch $h^4$ on the link or bar $h^5$ pivoted at the upper end $h^6$ to the worm shaft $h$, and the shoulder or catch $h^7$ on the side of the worm wheel. The shoulder coming in contact with the latch $h^4$ lifts the worm from engagement with the worm wheel. To obtain an engagement of these parts and a partial rotation of the cylinder the latch $h^4$ is moved away from the catch $h^7$ by means of the arm or lever $h^5$, and this permits the worm wheel and worm to engage, and a slow rotation of the shaft $g'$ then begins. It is stopped, however, as the latch $h^4$ comes into engagement with the catch $h^7$, and the worm is lifted. The latch $h^4$ is immediately returned to an engaging position by means of a spring $h^8$, acting through the push rod or bar $h^9$ upon the lower end of the lever or arm $h^5$.

The nails may drop head foremost through the channels E and distributing tubes to their destination, or they may be turned in their descent to bring the heads uppermost. The device for accomplishing this we have represented in the drawings.

The channels E, it will be observed by referring to Fig. 2, are wide at their top and gradually narrow. They also preferably are open a greater portion of their length. The sliding nails are by the inclined edges $e\ e'$ of the channels gradually brought to a straight position and finally enter the nail holders $e^\times$ in the slide $e^2$, there being a separate slide at the lower end of each group of channels. (See Fig. 3.) Upon one side of each nail holder $e^\times$ is a long narrow hole $e^3$ which opens into the enlarged end $e^4$ of a feed chute or tube $e^5$. (See Fig. 3.) This hole, however, does not extend quite so far outwardly as the holder $e^\times$ in the slide, so that when the slide is moved to bring the holders $e^\times$ over the holes $e^3$, the holders $e^\times$ extend beyond the holes $e^3$, there being a slight ledge $e^6$ below the holder $e^\times$ and at the end of the hole $e^3$. (See Fig. 2.) This is sufficient to hold the heads of the nails which are at the lower or outer ends of the holders $e^\times$, while the points are free to fall downward into the upper ends of the tubes $e^5$, and the nails are thus reversed. (See Fig. 3.) The slides $e^2$ are moved by the cams $m\ m'$ in the cam disks $m^2\ m^3$ upon the shaft B, and where the mechanism is arranged for double distribution each of these cam disks have two cams, one of which operates in connection with its companion cam in the other disk for operating one set of slides on one side of the shell, and the other for operating the other set of slides upon the opposite side of the shell. These cam disks of course have the oscillating or turning movement of the shell, and the slides $e^2$ are moved to carry the nails to the openings $e^3$ while the pockets are descending and are transferred to be in line with the channels E while the pockets are ascending.

The vibratory movement of the shaft B is not communicated to the gear $g^6$ or the cam disks. These parts are held by the frame, the shaft being free to move through them. The oscillating or vibrating movement is imparted to the cylinder or case by means of a pin R extending from the cam disk $m^3$ through a hole in the adjacent head of the cylinder or case, and the pin is made sufficiently long to permit the head to play upon it as it is vibrated. The cam disk $m^3$ is turned by means of the pin R' which connects the head of the cylinder with the cam disk, the pin being fastened in the cam disk and extending from a hole in the head, the head being free to play back and forth on the pin.

With the organization shown in the drawings there are, of course, two sets of nail receiving tubes $e^5$, one to take the nails from one group of pools and the other from the other group of pools, and these two groups of tubes preferably are arranged to come together at N, (see Fig. 1) into a tube or nozzle common to both sets of tubes. These may have any desired arrangement. We have represented them as held by a plate $n$, and as discharging the nails into distributer tubes $n'$, the distributer tubes being preferably detachably held between the plates $n$ and $n^2$, the plate $n^2$ having counter sunk holes $n^3$ in the counter sinks of which the lower ends of the tubes rest.

The upper ends of the tubes are preferably bell-shaped and are loosely supported beneath the outlets of the nozzles N by holders $o$, in which they have a vertical movement, sufficient to permit their lower end to be disengaged from the counter-sinks of the plate $n^2$.

Figure 4:
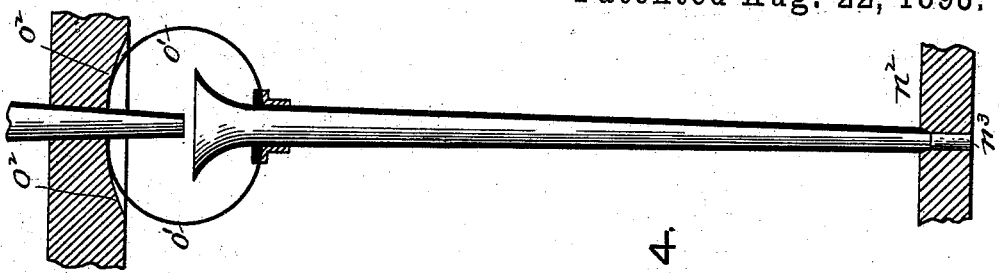
Figure 5:
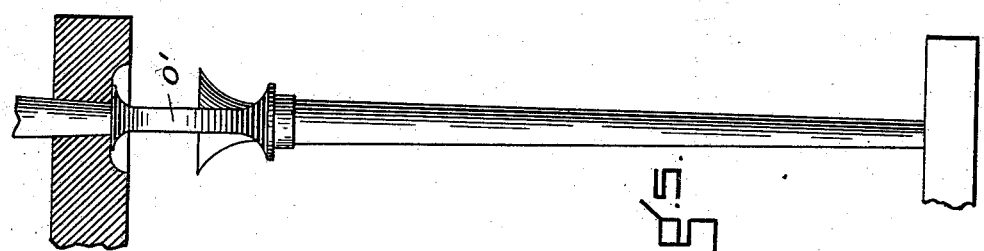
Figure 6:
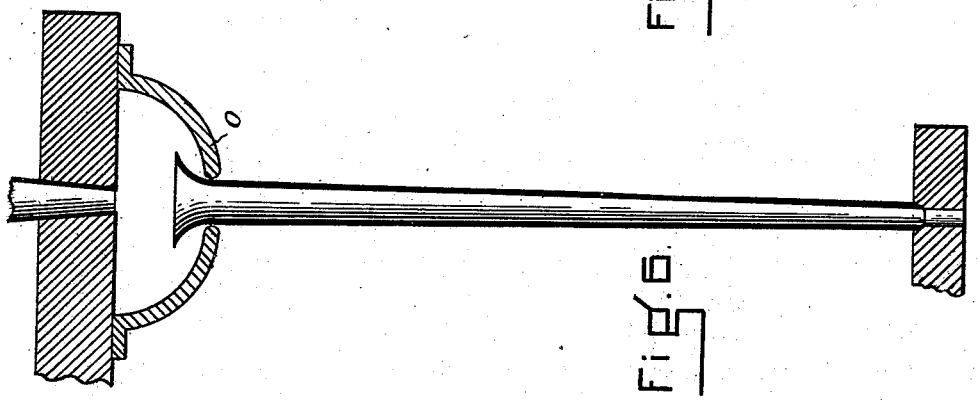
Figure 7:
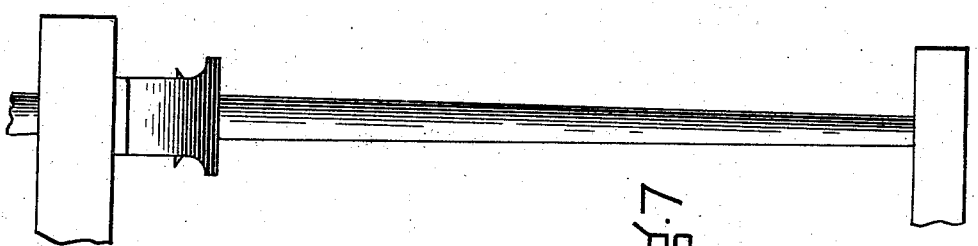

The holders preferably are attached to the plate $n$ and are in the form of a pocket having a hole through which the tube extends, and the upper end of the tube is either some distance below the nozzle, as represented in Fig. 6, whereby vertical movement may be given, or is larger than the end of the nozzle, as represented in Fig. 4, whereby also vertical movement is given it.

In the structure shown in Fig. 4 in lieu of a pocket for holding the upper end of the tube, we have shown springs $o'$ attached to the tube and entering holding recesses $o^2$ in the inner surface of the plate $n$. These springs are of a shape and form to hold the tube centrally in relation to the nozzle and yet permit the tube to be moved upwardly in relation thereto, to disengage its lower end from the plate $n^2$. This device is especially applicable for sorting or separating and distributing headless nails like heel nails.

It will be understood, of course, that the nail turning device at the ends of the channels E may be dispensed with where it is not desired that the nails be turned in their descent from the channels E, and in this case the channels would enter directly into the distributing tubes.

The devices as represented are adapted for the double distribution of nails; that is at the end of each half oscillating movement of the nail holding cylinder there is delivered a gang of nails upon one side of the cylinder or the other. When the devices are used for single distribution the holder makes a full oscillation for each group delivered; that is, the pools are moved downward into the nails and then upward again to deliver their nails to the channels.

We would not be understood as limiting the shape of the nail holder to a cylindrical form, as it may be elliptical or it may be square, or have any other desired shape, the essential elements of this part of the invention being that the case shall act as a holder for the nails, and shall carry pockets or pools in its wall, which shall be by the movement of the case transferred from underneath the nails to a position above them at one side, from which the nails can be delivered by gravity from the case through discharge openings in the case.

The manner of attaching the tubes $n'$ to the plate $n$ also permits of the lateral adjustment of their lower ends.

Having thus fully described our invention, we claim and desire to secure by Letters Patent of the United States—

1. In a machine of the character specified a nail separating device comprising a rapidly longitudinally vibrating and oscillating cylinder or case, having one or more pools or pockets in its shell arranged to receive nails from nails held in bulk in the cylinder or case while at or near their lowest position and to raise them from said position to a delivery channel or channels, as and for the purposes described.

2. In a machine of the character specified a vibrating and oscillating cylinder or case adapted to receive and contain nails in bulk, and having as a portion of the cylinder wall or case one or more sets of pools or pockets adapted to receive nails when in their lowest position, and to elevate them by partial rotation of the cylinder to a delivery position, and devices for closing or keeping closed the delivery side or sides of the pool or pools until it or they reach a delivery position, as and for the purposes described.

3. The combination in a machine of the character specified of a cylinder or case adapted to receive and hold nails in bulk and having a sharp vibrating and an oscillating or rotative movement back and forth, with one or more pools or pockets formed in the cylinder wall or case, arranged to open outward, and each of which has an inclined surface $c'$ when in delivery position, as and for the purposes described.

4. The combination in a machine of the character specified of the cylinder or case adapted to receive and hold nails in bulk and having a sharp vibrating, and an oscillating or rotative movement back and forth with one or more pools or pockets formed in the cylinder wall or case, arranged to open outward, and each of which has an inclined surface $c'$ when in delivery position and a nail holding finger or projection $c^4$, as and for the purposes described.

5. The combination of the cylinder or case adapted to receive and hold nails in bulk and having a sharp vibratory and an oscillating movement imparted to it with one or more pool or pocket plates C C' detachably secured in openings in the wall of said cylinder or case, as and for the purposes described.

6. In a nail separating and feeding device a rotary cylinder holding headless nails in bulk, and having a series of nail separating and holding pockets arranged lengthwise the cylinder, each of a size to receive and hold a single headless nail lying horizontally, a finger or detent upon the inner side of each pocket near the center of its length for holding a single nail therein and horizontal openings in the shell behind said pockets which are uncovered after the nails have been lifted from the mass to permit of their escape outwardly from the pockets all arranged whereby without the use of auxiliary nail feeding device the nails are separated and fed from the mass held in the cylinder by means of the pockets which rotate beneath them, as and for the purposes described.

7. In a nail separator a pool or pocket having a narrow finger $c^4$ in the center of the side for the retention of the nail.

8. In a machine of the character specified the cylinder or shell A, adapted to hold nails in bulk, and having an oscillating and rapid longitudinal vibratory movement and one or more pocket or pool plates in the wall or shell of the cylinder, which are straight across the opening or openings in the case or shell in which they are placed, as and for the purposes described.

9. In a machine of the character specified the eccentrically hung cylinder A adapted to receive and hold nails in bulk, and having a sharp longitudinal vibratory movement, and an oscillating movement with one or more straight pool or pocket plates, having two or more lines of pools or pockets, and nail receiving channels for each line, disposed to be brought into operative relation simultaneously with each line of pools as they are moved to the same, as and for the purposes described.

10. In a machine of the character specified, the cylinder A, adapted to receive and hold nails in bulk, and having a rapid longitudinal vibratory movement, and an oscillating movement with one or more plates having pools or pockets arranged in the shell of the cylinder and having outward openings, and a slide plate also having openings arranged to cover the outer ends of the pool or pocket openings while they are receiving and transferring nails, and then to act to uncover said openings when they are brought in line with the nail feed or escape channels, substantially as described.

11. The combination of the shell or cylinder A adapted to receive and hold nails in bulk, having a sharp longitudinal vibratory movement and an oscillating movement, one or more pool or pocket plates in the wall or case of the cylinder, and the covering plate or plates attached to the cylinder to rotate with it, and acting to cover the pool or pocket holes while they are receiving nails and transferring them, as and for the purposes described.

12. The combination in a machine of the character specified of a nail holding case or cylinder having a rapid vibratory movement and an oscillating movement, a nail holding pocket or pockets in the wall or shell of said cylinder opening outward, escape channels, and a nail turning bar between the pool or pools when in delivering position and the escape channels, as and for the purposes described.

13. The combination of the nail holding cylinder A having a rapid longitudinal vibratory movement, and an oscillating movement, a plate C, having one or more lines of nail holding pools or pockets therein in the wall or shell of the case or cylinder, a plate for closing said openings, excepting when the pools or pockets are in delivering position, and which has openings which then coincide with the nail channels and pockets, and nail turning bars in said openings, substantially as described.

14. The combination of the nail holding cylinder A, having a rapid vibratory movement, and an oscillating movement, the pool or pocket plates C C' in openings in said wall or case reversely arranged in relation to each other, and having one or more lines of pools or pockets $c$, their covering plates shaped as described, and two sets of nail receiving channels, one upon each side of the cylinder and adapted to receive nails, one from one set of pools or pockets and the other to receive nails from the other set of pools or pockets, in alternate order, as and for the purposes described.

15. The combination of the nail holding cylinder, having a rapid longitudinal vibratory movement, and an oscillating movement, and one or more lines of pools or pockets in the shells or walls thereof, a cover plate for opening and closing the outlet to the pools, the channels E, and nail turning devices at the lower ends of said channels, substantially as described.

16. The combination of the nail holding cylinder A, having a rapid longitudinal vibratory movement, and an oscillating movement with a pool or pocket plate in its wall or shell having two or more horizontal lines of pools or pockets, a cover plate for the outlets of each line of pools or pockets, and a set of delivery channels one above the other for each line of pools or pockets, as and for the purposes described.

17. The combination of a nail holding cylinder having a rapid longitudinal vibratory movement and an oscillating movement, nail holding pockets or pools in its shell or wall having outlets, and a cover plate to cover said outlets, the channels E, and a slide having nail receiving holders $e'$ arranged to be moved across the lower end of said channels and receive nails head first from said channels and deliver them to the holes $e^3$ over a turning edge $e^6$, as and for the purposes described.

18. As a means for turning nails a slide plate having one or more nail holding pockets arranged upon a plate having holes through which the nails are adapted to escape, and a turning shoulder $e^6$ for temporarily holding one end of a nail when the shoulder and nail holder have been brought into line and while the other end of the nail is turning, as and for the purposes described.

19. The combination of a single nail distributing device adapted to deliver nails alternately to two sets of stationary nail receiving and delivering chutes or passages with said chutes or passages, and a common receiving nozzle or tube for each pair of said nail receiving and delivering chutes or passages, as and for the purposes described.

20. The combination of a plate $n$ receiving the ends of nail distributing tubes or nozzles, plate $n^3$ and the distributing tubes $n'$ vertically movable in relation to the plate $n$ or the nail distributing tubes or nozzles thereof, as and for the purposes described.

21. The combination of the plate $n$, one or more nail delivering nozzles or tubes $n'$, and a distributing tube for each nozzle, the opening of which is bell-shaped or enlarged, and a holding device for attaching the upper end of the tubes $n'$ to the plate while permitting them to have vertical movement in relation thereto, as and for the purposes described.

22. The combination of the nail holding cylinder having pockets or pools in its shell or wall, a crank and connecting device for imparting to it a rapid longitudinal vibratory movement, and a cam and connecting devices for oscillating the cylinder and holding it stationary while the pools or pockets are discharging, substantially as described.

23. The combination of the nail holding cylinder having nail holding pockets or pools in its shell arranged to discharge nails outwardly, means for imparting to the cylinder a vibratory movement, and an oscillating movement, nail delivering channels, nail reversing slides, and one or more cams for reciprocating said reversing slides, as and for the purposes described.

24. The combination of the nail holding cylinder having one or more lines of nail pools or pockets in its shell, means for continuously imparting to said cylinder a vibratory movement, devices for oscillating said cylinder connected with the mechanism for vibrating the cylinder by a make and break connecting device, as and for the purposes described.

25. The combination of the nail holding cylinder, its nail holding pockets arranged in its shell, devices for imparting to it a vibratory movement, mechanism for oscillating the cylinder, and an actuating connection for said last named mechanism adapted to be engaged with it by hand, and to be automatically disconnected from it, as and for the purposes described.

JOHN M. BENJAMIN.
RALPH C. SIMMONS.

Witnesses:
F. F. RAYMOND, 2d,
J. M. DOLAN.